June 26, 1962  L. LAMB  3,040,769
FLOAT VALVE

Filed June 30, 1960  2 Sheets-Sheet 1

INVENTOR.
Leslie Lamb
BY
Frost & Vandenburgh
Attys

June 26, 1962  L. LAMB  3,040,769
FLOAT VALVE

Filed June 30, 1960  2 Sheets-Sheet 2

INVENTOR.
Leslie Lamb
BY
Frost & Vandenburgh
Attys

United States Patent Office 3,040,769
Patented June 26, 1962

3,040,769
FLOAT VALVE
Leslie Lamb, 4024 Waveland Ave., Chicago 41, Ill.
Filed June 30, 1960, Ser. No. 39,944
7 Claims. (Cl. 137—420)

The present invention relates to a ball-cock for controlling the admission of water to a flush tank of a water closet.

In the conventional type ball-cock, a float which rides on the surface of the water in the tank is operatively connected to a valve to refill the tank with water each time that the tank is emptied. In theory, the valve is open when the float is adjacent the bottom of the tank and is closed when the float reaches a level adjacent the top of the tank. The difficulty with these conventional valves is that the valve closes slowly as it approaches the upper level. Thus, the water flow is gradually reduced and during the upper stages of the travel of the float may be little more than a trickle. This increases the length of time for the tank to fill over what it would be if the valve remained fully open until such time as it was to be completely closed. Furthermore, under some circumstances a valve that is only open to a small extent, such as occurs during the latter stages of the travel of the float, may become noisy or whine. This noise, of course, is annoying to those in the vicinity.

Various suggestions have been made from time to time for a valve which will remain fully open until the desired water level has been achieved and thereupon will shut off immediately, as distinguished from a gradual closing of the valve. In theory, such a valve would overcome the problems previously mentioned but most of the suggestions that have been made for such types of valves have introduced other complications. In general, the suggested modifications are complicated and expensive to manufacture. The price differential makes them difficult to sell in competition with conventional type ball-cocks. In many instances, they are unreliable and tend to stick in the open position. This is complicated by the fact that under the conditions in which they operate they may tend to corrode, etc., with the parts not moving as freely as was the case when they were manufactured. Of course, when the valve freezes in the open position, the tank is apt to overflow, a most undesirable condition. Even if it doesn't overflow, it will result in a substantial waste of water. To make sure such types of valves do not stick, continued maintenance is necessary.

The principal object of the present invention is to provide a ball-cock of the type which will remain fully open until the desired water level is achieved, and which then will act reliably to close the cock even under the conditions of service encountered in the use of such valves. The apparatus of my invention utilizes a latch mechanism to hold the main float arm in a position at which the valve will be fully open, with the latch mechanism being such that it will positively be released when a supplemental control float reaches a predetermined level. With the release of the latch, the main float rises rapidly towards the surface of the water in the tank. This immediately and positively shuts the water valve. A further feature of my invention is that it is so constructed that when the valve is closed by the release of the main float by the latch I have devised, the main float arm is held somewhat depressed by the valve as compared to the position which that arm would assume were the float permitted to rise freely to the surface. Thus, the buoyancy of the float continues to urge the main float arm in the valve closing position, preventing any leakage of the valve.

A further object of the ball-cock I have devised is that if the water closet is not to be used for some time, as for example should the homeowner go on a vacation, it is a very simple matter to lock the valve in the closed position so that it will not be affected by the water level in the tank. This is achieved merely by raising the main float arm above the maximum limit of its normal operating position, at which time the actuating mechanism for the valve becomes wedged in the closed position, with the main float and float arm being supported by the valve mechanism rather than by the level of the water in the tank.

Further objects and advantages will become apparent from the following description taken in conjunction with the drawings, in which.

Figure 1:
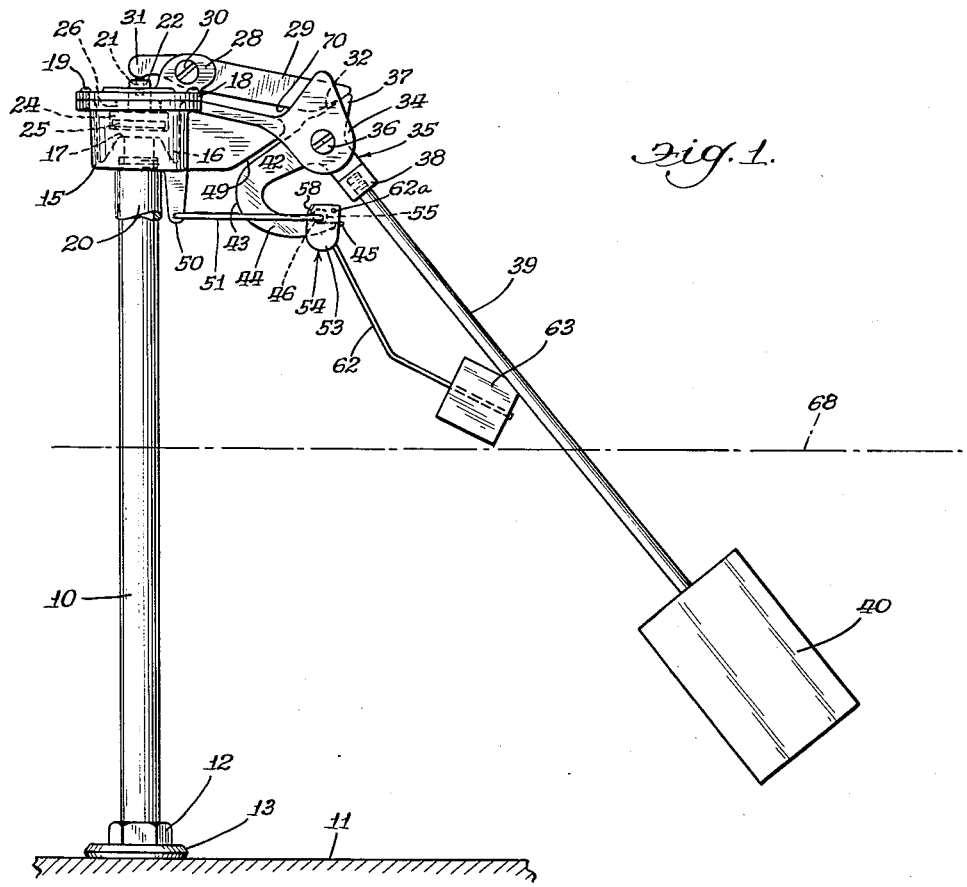
FIGURE 1 is an elevational view of an embodiment of my invention illustrating the position of the parts after the water tank has been emptied and before it has been refilled to any substantial extent.

Referring to FIGURE 1, there is illustrated a standpipe 10 which is connected to a suitable source of water supply (not shown). Pipe 10 is secured to the bottom 11 of the flush tank of a water closet by a nut 12 with a gasket 13 being interposed between the nut and the tank bottom 11. Threaded onto the top of pipe 10 is a valve body 15 having an internal opening or chamber 16 in communication with the interior of pipe 10. Valve body 15 forms a valve seat 17 immediately above the interior of pipe 10. A cover plate 18 secured to valve body 15 by a plurality of screws 19 encloses the chamber 16. A discharge pipe 20 (FIGURE 2) communicates at its top with the chamber 16 and at its bottom opens into the lower part of the water tank.

A valve stem 22 is suitably journaled in a boss 23 in cover plate 18. Valve stem 22 has an adjusting screw in the top thereof. Secured in a head 24 at the bottom of valve stem 22 is a valve washer 25. Washer 25 is positioned to cover valve seat 17 to shut off the flow of water from pipe 10 to chamber 16 as hereinafter described. A spring 26 encircling boss 23 bears between the bottom of cover plate 18 and the top of head 24. Spring 26 resiliently urges the valve closure member (head 24 and washer 25) toward the valve seat 17, and closes the valve when little or no water pressure exists in pipe 10.

A pair of spaced ears 28 extend upwardly from cover plate 18 to serve as a mounting for operating lever 29 positioned between the ears. Lever 29 is suitably journaled on a screw 30 passing through one of ears 28 and threaded into the other of the ears. One end 31 of lever 29 is positioned to contact adjusting screw 21 on the top of valve stem 22. The other end of lever 29 forms a camming surface 32.

A support member having a bifurcated head 34 extends out to one side from body 15 to support a valve operating member generally 35. Operating member 35 is journaled on a screw 36 extending between the sides of bifurcated head 34. Operating member 35 has a cam end 37 which is operatively associated with cam surface 32. Threaded into a support portion 38 of operating member 35 is a float rod 39 having a float 40 secured to the opposite end thereof. Operating member 35 also forms a latch arm generally 41 having an upper arm portion 42 extending downwardly away from support portion 38. At the bottom end of depending portion 42 is an elbow 43 followed by a forearm 44. At the end of forearm 44 is a finger 45. Where the base of finger 45 meets forearm 44 is an abutment 46.

Figure 2:
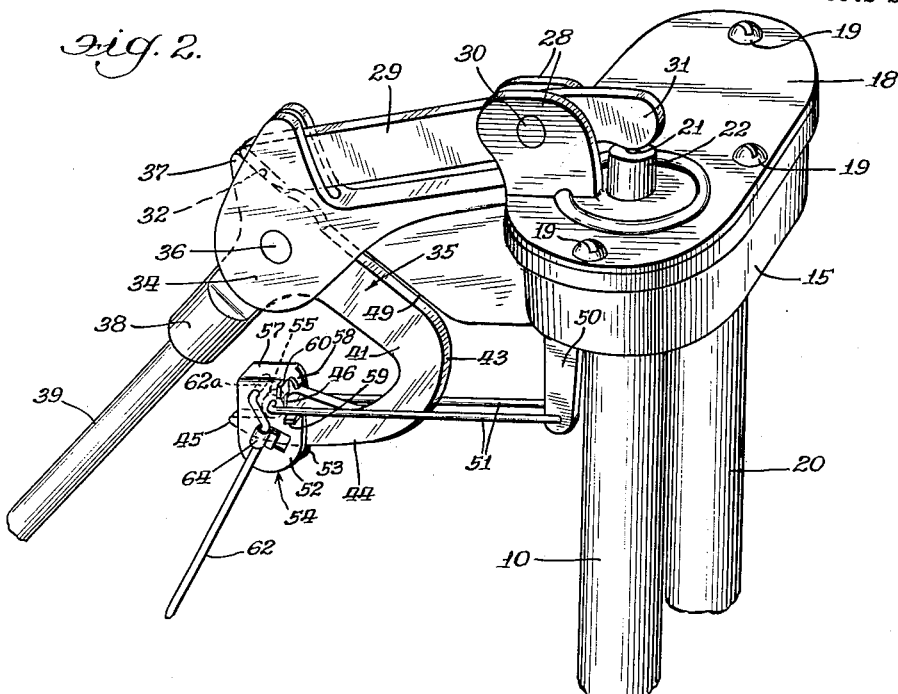
FIGURE 2 is a perspective view of the latch mechanism I have devised.

A depending portion of the side support that terminates in bifurcated head 34 forms a stop 49. Stop 49 is positioned to contact upper arm portion 42 to limit the pivotal movement of the valve operating member 35 in a clockwise direction, as viewed in FIGURE 1. A further depending portion 50 has an opening adjacent the bottom thereof in which is pivotally received a two-sided connecting link 51. The two sides of link 51 extend outwardly at each side of arm 41, as seen in FIGURE 2. The two sides of link 51, at the other end thereof, turn inwardly and pass through the sides 52 and 53 of a pivotable member generally 54. Member 54 may be pivoted with respect to link 51 as hereinafter described. Between the sides 52 and 53, a roller 55 is journaled on link 51.

Extending from the top 57 of member 54 is a finger 58. A pair of stops 59 and 60 (FIGURE 2) extend outwardly from side 52 of member 54.

A second float arm 62 is eccentrically affixed to pivotable member 54 at one end and at the other end carries a second or unlatching float 63. The attachment of arm 62 to member 54 is achieved by securing the arm under a flap 64 bent outwardly from side 52 of member 54, with the end 62a projecting through a pair of openings in sides 52 and 53.

Figure 4:
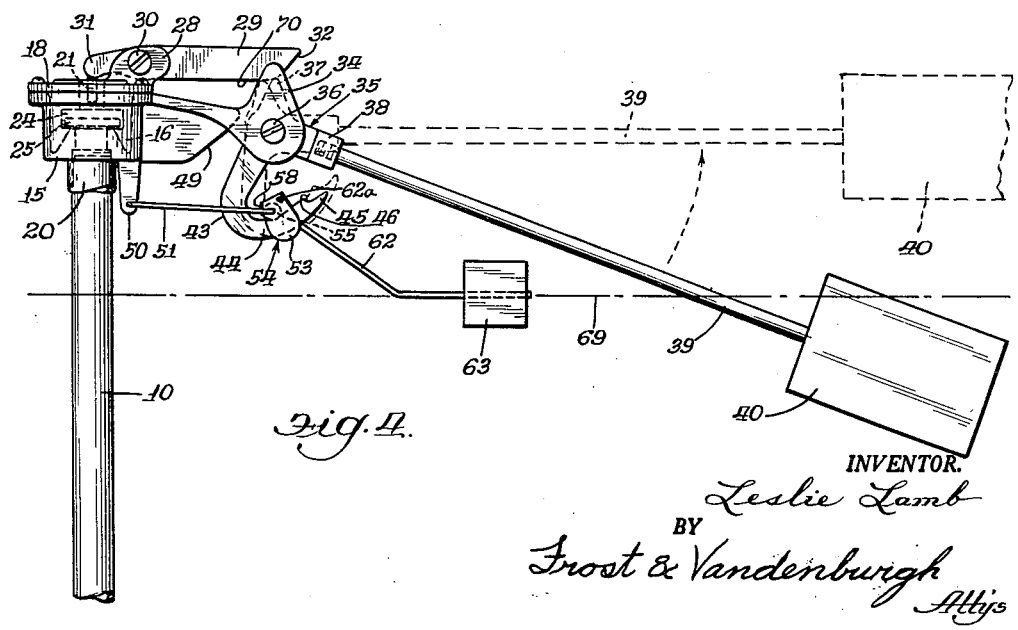
FIGURE 4 is an elevational view illustrating the position of the valve parts at the time that the valve is closed.

FIGURE 4 illustrates the position of the valve at the time that the water closet tank is filled to the desired level. Upon the tank being drained by the flushing of the water closet, float 40 descends until the upper portion 42 of arm 41 abuts stop 49. This releases lever 29 and permits valve stem 22 to move upwardly. The pressure of the water in pipe 10 will push the valve head 24 and stem 22 upwardly away from seat 17, thus permitting water to flow into chamber 16 and into the tank through discharge pipe 20.

As float 40 descended from the FIGURE 4 position, arm 41 moved to the left as viewed in FIGURES 1 and 4. Since link 51 prevented any corresponding movement of the latch 54, roller 55 rides along the top of forearm 44 until abutment 46 is reached, after which time roller 55 rides along the top of finger 45. Finger 45 is sufficiently long so that when the arm 41 is against stop 49, roller 55 will still be on the top of the finger 45.

As the tank commences to refill, the water will begin raising float 40. Little movement of float 40 is permitted, however. As the float commences to rise, arm 41 moves to the right as viewed in FIGURES 1 and 4, but after only a short movement of the arm away from stop 49 the abutment 46 of the arm comes into contact with roller 55. The position of the valve parts at this time are illustrated in FIGURES 1 and 2. Since link 51 prevents movement of roller 55 to the right in FIGURE 1 and since the link is substantially normal to the face of abutment 46, roller 55 acts as a latch to prevent further movement of arm 41 to the right, away from valve body 15. This prevents any further pivotal movement of operating member 35 so that the valve remains fully open despite the fact that the water level is raised well above the top of the float 40. Thus, the parts remain in the FIGURE 1 position until the water level increases above that illustrated at 68 in FIGURE 1.

However, as the water level increases above the level 68 of FIGURE 1, it commences raising auxiliary float 63. Since arm 62 is attached to pivotal member 54 eccentrically of the pivotal axis theerof, as defined by the end of link 51, the upward movement of float 63 commences pivoting member 54 about the end of link 51. This pivotal movement of member 54 brings cam finger 58 thereof into contact with the upper side of forearm 44 immediately adjacent the face of abutment 46. Thereafter, continued pivotal movement of member 54 causes that member to raise. Because of the eccentric position of cam finger 58, the parts move to the position illustrated in FIGURE 3. The raising of pivotal member 54 moves roller 55 upwardly to the rounded top of abutment 46. Of course, there is a corresponding upward pivotal movement of link 51. Roller 55 is now free of the straight face of abutment 46 so that the top rounded corner of the abutment will move under the roller.

Figure 3:
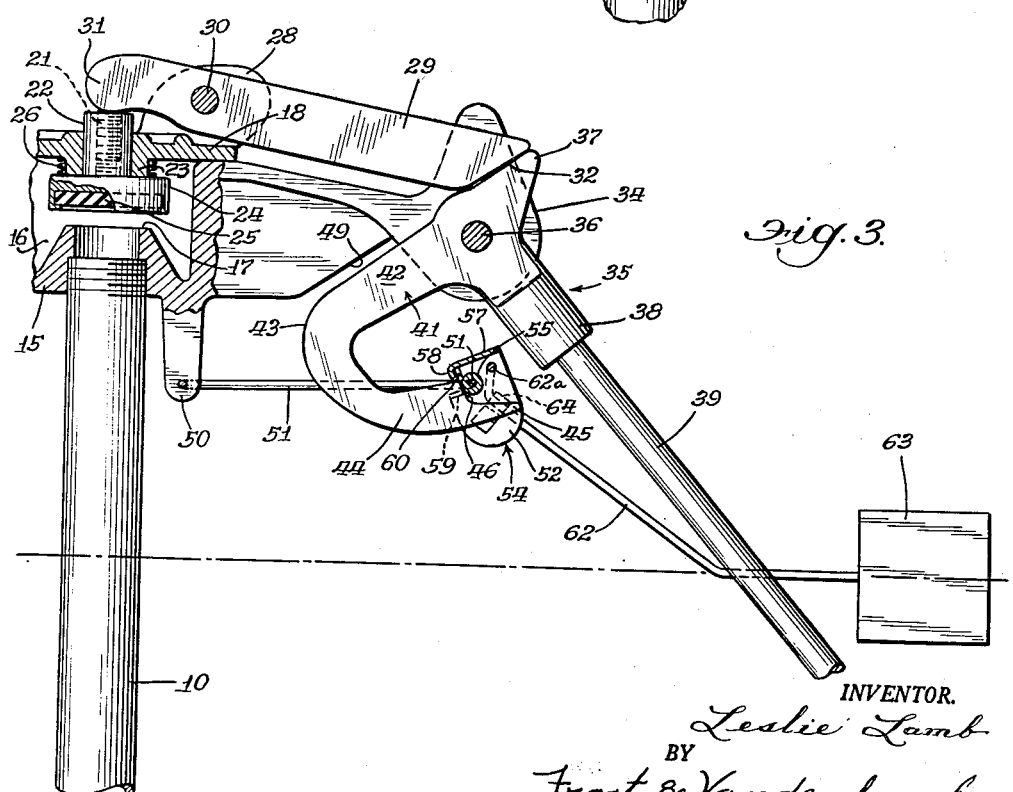
FIGURE 3 is an elevational section illustrating the position of the latch parts at the time of unlatching.

Arm 41 is now free to move to the right in FIGURES 1 and 3, allowing the buoyancy of float 40 to raise arm 39. Operating member 35 pivots counterclockwise to the FIGURE 4 position, at which time lever 29 is pushed down on valve stem 22 to close the valve. Since the closing of the valve prevents further movement of lever 29, operating member 35 is prevented from further counterclockwise movement from the FIGURE 4 position. At this time, float 40 is still below the position it would assume with respect to water level 69 were it not restrained by the contact between operating member 35 and lever 29. This insures that once valve head 24 has moved down to close the valve, it will remain closed despite minor variations in the height of water level 69. The position of adjusting screw 21 may be varied to fix the proper position of lever 29 when the valve is closed.

Should it be desired to close the valve, as for example to permit minor repairs to be made to the water closet or should a householder be going on a vacation, this is readily done by the apparatus I have devised. To close the valve so that it will not be affected by a change in the water level within the tank, it is only necessary to reach into the tank, grasp float rod 39, and pull the rod upwardly to substantially the horizontal position illustrated in dotted lines in FIGURE 4. This causes the cam end 37 of operating member 35 to move under the flat bottom side 70 of lever 29. The result is that operating member 35 and lever 29 are wedged together with sufficient pressure to hold float rod 39 and float 40 in the substantially horizontal position illustrated in dotted lines in FIGURE 4. Thus, any change in water level of the tank will not reopen the valve. When it is desired to open the valve to put it back into normal operation, it only is necessary to push down on float 40 or float rod 39 to release cam end 37 from under lever 29, thus returning the parts to the FIGURE 1 or FIGURE 4 (full line) positions, depending upon the level of the water within the tank at that time.

The foregoing description of a specific embodiment is for the purpose of complying with 35 U.S.C. 112 and should not be construed as imposing unnecessary limitations upon the appended claims, inasmuch as modifications and variations thereof will be apparent to those skilled in the art.

I claim:

1. In a ball-cock mechanism for operating a valve having a valve stem mounted in a valve body in response to a first float: an operating means pivotally mounted on said body and having said float secured thereto, one portion of said means being positioned to contact said valve stem to close the valve when said float is at a first raised position and to allow said valve to open when said float is at a second lowered position; an arm attached to said means to move therewith along a given path in a given direction when said means moves from said second to said first position, said arm having an abutment facing in said direction; a latch positioned in said path to contact said abutment as said arm moves in said direction from said second position; a connecting device pivotally attached to said body and attached to said latch to resist further movement of said arm in said direction after said latch contacts said abutment thereby holding said valve open; a second float; and an unlatching device connected to said float, pivotally attached to said connecting device, and including a finger to press against said arm as said second float is raised to pivot said connecting device and move said latch out of said path whereby said arm and operating means may be moved by said first float to said first position.

2. In a ball-cock mechanism for operating a valve having a valve stem mounted in a valve body in response to a first float: an operating means pivotally mounted on said body and having said float secured thereto, one portion of said means being positioned to contact said valve stem to close the valve when said float is at a first raised position and to allow said valve to open when said float is at a second lowered position; an arm attached to said means to move therewith along a given path in a given direction when said means moves from said second to said first position, said arm having an abutment facing in said direction; a roller positioned in said path to contact said abutment as said arm moves in said direction from said second position; a connecting device pivotally attached to said body and rotatably connected to said roller with a line between said body attachment and said rotatable connection being about normal to the face of said abutment, whereby said roller will resist further movement of said arm in said direction after said roller contacts said abutment to hold said valve open; a second float; a pivotable member mounted on said connecting device coaxially with said roller; an arm eccentrically attached to said pivotable member and attached to said second float; and a finger attached to said pivotable member and extending about a side of said roller immediately adjacent the top of said abutment when said roller is against said abutment; whereby a raising of said second float will pivot said finger against the top of said abutment to push said connecting device and said roller away from said arm to thereby disengage said roller from said abutment and release said operating means to close said valve.

3. In a ball-cock having a valve body, a valve operating member, a first float connected to said member, a latch arm connected to said member and having an abutment thereon, a latch member pivotally connected by a link to said body and positioned to contact said abutment to latch said cock open, and an unlatching float, the improvement comprising: an unlatching member pivotally mounted on said link and having an eccentric finger extending to contact said arm to pivot said link when said unlatching member is rotated in a given direction; and an arm connected to said unlatching float and eccentrically connected to said unlatching member to rotate said unlatching member in said direction when said unlatching float is raised.

4. A ball-cock comprising: a valve body; a valve operating means having a first float on the end thereof to close said cock when said float is raised; means to limit the extent of downward movement of said first float; a latching arm attached to said means and extending downwardly from said means with a portion extending away from the body in a generally horizontal direction, said portion having a generally horizontal finger on the end thereof, said arm forming an upwardly extending abutment at the base of the finger; a link pivotally connected to said body and extending along a side of said portion; a roller resting on said finger, said roller being rotatably connected to said link along a generally horizontal axis parallel to said abutment; an unlatching member pivotally connected to said link and having means to raise said link with respect to said arm when said unlatching member is pivoted in one direction with respect to said arm; a second float; and means connecting said second float to said unlatching member to pivot said unlatching member in said direction when said second float is raised.

5. A ball-cock comprising: a valve body; a valve stem movable vertically within said body to open and close said cock; a valve operating lever pivotally connected about a horizontal axis to said body intermediate the ends of the lever, one end of the lever being positioned above said stem to push down on said stem, said lever defining a downwardly facing camming surface adjacent the other end thereof; an operating member pivotally connected to said body about a horizontal axis below said other end of said lever, said operating member having an outwardly extending cam part to contact said surface to move said lever as said operating member is pivoted, said operating member being manually movable to a position at which said cam part is positioned vertically between the last named axis and said lever to hold said valve stem down, said operating member having a rod extending downwardly at an angle away from said body, said operating member having an arm extending downwardly to an elbow and thereafter in a generally horizontal direction toward said rod and a finger on the end of said arm, said finger defining an abutment on the arm at the base of the finger; a first float attached to said rod; a link pivotally connected to said body and extending along a side of said portion; a roller resting on said finger, said roller being rotatably connected to said link along a generally horizontal axis parallel to said abutment; an unlatching member pivotally connected to said link and having means to raise said link with respect to said arm when said unlatching member is pivoted in one direction with respect to said arm; a second float; and means connecting said second float to said unlatching member to pivot said unlatching member in said direction when said second float is raised.

6. A ball-cock comprising: a valve body; a valve stem movable vertically within said body to open and close said cock; a valve operating lever pivotally connected about a horizontal axis to said body intermediate the ends of the lever, one end of the lever being positioned above said stem to push down on said stem, said lever defining a downwardly facing camming surface adjacent the other end thereof; an operating member pivotally connected to said body about a horizontal axis below said other end of said lever, said member having an outwardly extending cam part to contact said surface to move said lever as said member is pivoted, said cam part having an end extending from the last axis a greater distance than the adjacent portions of said part, said member being manually movable to a position at which said cam part is positioned vertically between the last named axis and said lever with said end against the bottom of said lever to hold said valve stem down, said member having a rod extending downwardly at an angle away from said body; and a float attached to said rod.

7. In a ball-cock mechanism adapted to open and close a valve in response to a fluid level, said valve having a valve seat, an obturating member adapted to be positioned in fluid sealing relation on said valve seat in valve closed position and to be axially spaced from said valve seat in valve open position, and a valve stem operatively connected to said obturating member: operating means pivotally mounted on and with respect to said valve, one portion of said means adapted to engage said valve stem to urge the obturating member to fluid sealing relation with said valve seat in a first position and to valve open position in a second position; a first float operatively associated with said operating means and defining fluid level responsive means; an arm affixed to said operating means and adapted to move therewith in response to varying fluid level along a given path in a given direction, said arm having an abutment on one face thereof; a latch pivotally interconnected to said valve; latch means operatively associated with said latch and adapted to be engaged by said abutment on said arm when said operating means, under the urging of said fluid level responsive first float, are in valve open defining position, said latch means adapted to resist further rotative movement of said arm as said operating means moves from said second position to said first position to thereby hold said valve in valve open position during traverse of said operating means from said second position to said first position; a second fluid level responsive float interconnected to said latch and latch means and adapted to pivot said latch means out of engagement with said abutment in response to a predetermined fluid level.

References Cited in the file of this patent

UNITED STATES PATENTS

| | | |
|---|---|---|
| 1,564,533 | Cunningham | Dec. 8, 1925 |
| 2,722,231 | Hansen | Nov. 1, 1955 |
| 2,847,024 | Lamb | Aug. 12, 1958 |

FOREIGN PATENTS

| | | |
|---|---|---|
| 4,956 | Great Britain | Dec. 3, 1879 |
| 15,836 | Great Britain | Aug. 21, 1893 |
| 413,831 | Italy | June 7, 1946 |